US011976672B2

(12) United States Patent
Cooper

(10) Patent No.: US 11,976,672 B2
(45) **Date of Patent: *May 7, 2024**

(54) TENSIONED SUPPORT POST AND OTHER MOLTEN METAL DEVICES

(71) Applicant: Molten Metal Equipment Innovations, LLC, Middlefield, OH (US)

(72) Inventor: Paul V. Cooper, Chesterland, OH (US)

(73) Assignee: Molten Metal Equipment Innovations, LLC, Middlefield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,229

(22) Filed: Oct. 7, 2021

(65) Prior Publication Data

US 2022/0025905 A1 Jan. 27, 2022

Related U.S. Application Data

(63) Continuation of application No. 16/195,678, filed on Nov. 19, 2018, now Pat. No. 11,149,747.

(60) Provisional application No. 62/588,090, filed on Nov. 17, 2017.

(51) Int. Cl.

| | |
|---|---|
| ***F04D 29/60*** | (2006.01) |
| ***F04D 29/043*** | (2006.01) |
| *F04D 7/00* | (2006.01) |

(52) U.S. Cl.

CPC ......... *F04D 29/605* (2013.01); *F04D 29/043* (2013.01); *F04D 7/00* (2013.01); *F05B 2240/60* (2013.01); *F05B 2240/90* (2013.01)

(58) Field of Classification Search

CPC ...... F04D 29/605; F04D 29/042; F04D 7/065; F05B 2240/90

USPC ........................................ 248/677; 415/216.1

See application file for complete search history.

(56) References Cited

U.S. PATENT DOCUMENTS

| | | | |
|---|---|---|---|
| 35,604 | A | 6/1862 | Guild |
| 116,797 | A | 7/1871 | Barnhart |
| 209,219 | A | 10/1878 | Bookwalter |
| 251,104 | A | 12/1881 | Finch |
| 307,845 | A | 11/1884 | Curtis |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

"Response to Final Office Action and Request for Continued Examination for U.S. Appl. No. 09/275,627," including Declarations of Haynes and Johnson, dated Apr. 16, 2001.

(Continued)

*Primary Examiner* — Todd M Epps

(74) *Attorney, Agent, or Firm* — SNELL & WILMER L.L.P.

(57) ABSTRACT

A vertically-elongated member, which is preferably a support post used in a molten metal pump, includes a ceramic tube and tensioning structures to add a compressive load to the tube along its longitudinal axis. This makes the tube less prone to breakage. Another vertically-elongated member, such as a support post, includes one or more reinforcement members to help alleviate breakage. A device, such as a pump, used in a molten metal bath includes one or more of such vertical members.

22 Claims, 11 Drawing Sheets

(56) References Cited

U.S. PATENT DOCUMENTS 364,804 A 6/1887 Cole
390,319 A 10/1888 Thomson
495,760 A 4/1893 Seitz
506,572 A 10/1893 Wagener
585,188 A 6/1897 Davis
757,932 A 4/1904 Jones
882,477 A 3/1908 Neumann
882,478 A 3/1908 Neumann
890,319 A 6/1908 Wells
898,499 A 9/1908 O'Donnell
909,774 A 1/1909 Flora
919,194 A 4/1909 Livingston
1,037,659 A 9/1912 Rembert
1,100,475 A 6/1914 Franckaerts
1,170,512 A 2/1916 Chapman
1,196,758 A 9/1916 Blair
1,304,068 A 5/1919 Krogh
1,331,997 A 2/1920 Neal
1,185,314 A 3/1920 London
1,377,101 A 5/1921 Sparling
1,380,798 A 6/1921 Hansen et al.
1,439,365 A 12/1922 Hazell
1,454,967 A 5/1923 Gill
1,470,607 A 10/1923 Hazell
1,513,875 A 11/1924 Wilke
1,518,501 A 12/1924 Gill
1,522,765 A 1/1925 Wilke
1,526,851 A 2/1925 Hall
1,669,668 A 5/1928 Marshall
1,673,594 A 6/1928 Schmidt
1,697,202 A 1/1929 Nagle
1,717,969 A 6/1929 Goodner
1,718,396 A 6/1929 Wheeler
1,896,201 A 2/1933 Sterner-Rainer
1,988,875 A 1/1935 Saborio
2,013,455 A 9/1935 Baxter
2,035,282 A 3/1936 Schmeller, Sr.
2,038,221 A 4/1936 Kagi
2,075,633 A 3/1937 Anderegg
2,090,162 A 8/1937 Tighe
2,091,677 A 8/1937 Fredericks
2,138,814 A 12/1938 Bressler
2,173,377 A 9/1939 Schultz, Jr. et al.
2,264,740 A 12/1941 Brown
2,280,979 A 4/1942 Rocke
2,290,961 A 7/1942 Heuer
2,300,688 A 11/1942 Nagle
2,304,849 A 12/1942 Ruthman
2,368,962 A 2/1945 Blom
2,383,424 A 8/1945 Stepanoff
2,423,655 A 7/1947 Mars et al.
2,488,447 A 11/1949 Tangen et al.
2,493,467 A 1/1950 Sunnen
2,515,097 A 7/1950 Schryber
2,515,478 A 7/1950 Tooley et al.
2,528,208 A 10/1950 Bonsack et al.
2,528,210 A 10/1950 Stewart
2,543,633 A 2/1951 Lamphere
2,566,892 A 4/1951 Jacobs
2,625,720 A 1/1953 Ross
2,626,086 A 1/1953 Forrest
2,676,279 A 4/1954 Wilson
2,677,609 A 4/1954 Moore et al.
2,698,583 A 1/1955 House et al.
2,714,354 A 8/1955 Farrand
2,762,095 A 9/1956 Pemetzrieder
2,768,587 A 10/1956 Corneil
2,775,348 A 12/1956 Williams
2,779,574 A 1/1957 Schneider
2,787,873 A 4/1957 Hadley
2,808,782 A 10/1957 Thompson et al.
2,809,107 A 10/1957 Russell
2,821,472 A 1/1958 Peterson et al.
2,824,520 A 2/1958 Bartels
2,832,292 A 4/1958 Edwards
2,839,006 A 6/1958 Mayo
2,853,019 A 9/1958 Thornton
2,865,295 A 12/1958 Nikolaus
2,865,618 A 12/1958 Abell
2,868,132 A 1/1959 Rittershofer
2,901,006 A 8/1959 Andrews
2,901,677 A 8/1959 Chessman et al.
2,906,632 A 9/1959 Nickerson
2,918,876 A 12/1959 Howe
2,948,524 A 8/1960 Sweeney et al.
2,958,293 A 11/1960 Pray, Jr.
2,966,345 A 12/1960 Burgoon et al.
2,966,381 A 12/1960 Menzel
2,978,885 A 4/1961 Davison
2,984,524 A 5/1961 Franzen
2,987,885 A 6/1961 Hodge
3,010,402 A 11/1961 King
3,015,190 A 1/1962 Arbeit
3,039,864 A 6/1962 Hess
3,044,408 A 7/1962 Mellott
3,048,384 A 8/1962 Sweeney et al.
3,070,393 A 12/1962 Silverberg et al.
3,092,030 A 6/1963 Wunder
3,099,870 A 8/1963 Seeler
3,128,327 A 4/1964 Upton
3,130,678 A 4/1964 Chenault
3,130,679 A 4/1964 Sence
3,151,565 A 10/1964 Albertson et al.
3,171,357 A 3/1965 Egger
3,172,850 A 3/1965 Englesberg et al.
3,203,182 A 8/1965 Pohl
3,227,547 A 1/1966 Szekely
3,244,109 A 4/1966 Barske
3,251,676 A 5/1966 Johnson
3,255,702 A 6/1966 Gehrm
3,258,283 A 6/1966 Winberg et al.
3,272,619 A 9/1966 Sweeney et al.
3,289,473 A 12/1966 Louda
3,291,473 A 12/1966 Sweeney et al.
3,368,805 A 2/1968 Davey et al.
3,374,943 A 3/1968 Cervenka
3,400,923 A 9/1968 Howie et al.
3,417,929 A 12/1968 Secrest et al.
3,432,336 A 3/1969 Langrod et al.
3,459,133 A 8/1969 Scheffler
3,459,346 A 8/1969 Tinnes
3,477,383 A 11/1969 Rawson et al.
3,487,805 A 1/1970 Satterthwaite
3,512,762 A 5/1970 Umbricht
3,512,788 A 5/1970 Kilbane
3,532,445 A 10/1970 Scheffler et al.
3,561,885 A 2/1971 Lake
3,575,525 A 4/1971 Fox et al.
3,581,767 A 6/1971 Jackson
3,612,715 A 10/1971 Yedidiah
3,618,917 A 11/1971 Fredrikson et al.
3,620,716 A 11/1971 Hess
3,650,730 A 3/1972 Derham et al.
3,689,048 A 9/1972 Foulard et al.
3,715,112 A 2/1973 Carbonnel
3,732,032 A 5/1973 Daneel
3,737,304 A 6/1973 Blayden et al.
3,737,305 A 6/1973 Blayden et al.
3,743,263 A 7/1973 Szekely
3,743,500 A 7/1973 Foulard et al.
3,753,690 A 8/1973 Emley et al.
3,759,628 A 9/1973 Kempf
3,759,635 A 9/1973 Carter et al.
3,767,382 A 10/1973 Bruno et al.
3,776,660 A 12/1973 Anderson et al.
3,785,632 A 1/1974 Kraemer et al.
3,787,143 A 1/1974 Carbonnel et al.
3,799,522 A 3/1974 Brant et al.
3,799,523 A 3/1974 Seki
3,807,708 A 4/1974 Jones
3,814,400 A 6/1974 Seki
3,824,028 A 7/1974 Zenkner et al.
3,824,042 A 7/1974 Barnes et al.
3,836,280 A 9/1974 Koch

(56) References Cited

U.S. PATENT DOCUMENTS

| | | | |
|---|---|---|---|
| 3,839,019 | A | 10/1974 | Bruno et al. |
| 3,844,972 | A | 10/1974 | Tully, Jr. et al. |
| 3,871,872 | A | 3/1975 | Downing et al. |
| 3,873,073 | A | 3/1975 | Baum et al. |
| 3,873,305 | A | 3/1975 | Claxton et al. |
| 3,881,039 | A | 4/1975 | Baldieri et al. |
| 3,886,992 | A | 6/1975 | Maas et al. |
| 3,915,594 | A | 10/1975 | Nesseth |
| 3,915,694 | A | 10/1975 | Ando |
| 3,935,003 | A | 1/1976 | Steinke et al. |
| 3,941,588 | A | 3/1976 | Dremann |
| 3,941,589 | A | 3/1976 | Norman et al. |
| 3,942,473 | A | 3/1976 | Chodash |
| 3,954,134 | A | 5/1976 | Maas et al. |
| 3,958,979 | A | 5/1976 | Valdo |
| 3,958,981 | A | 5/1976 | Forberg et al. |
| 3,961,778 | A | 6/1976 | Carbonnel et al. |
| 3,966,456 | A | 6/1976 | Ellenbaum et al. |
| 3,967,286 | A | 6/1976 | Andersson et al. |
| 3,972,709 | A | 8/1976 | Chin et al. |
| 3,973,871 | A | 8/1976 | Hance |
| 3,984,234 | A | 10/1976 | Claxton et al. |
| 3,985,000 | A | 10/1976 | Hartz |
| 3,997,336 | A | 12/1976 | van Linden et al. |
| 4,003,560 | A | 1/1977 | Carbonnel |
| 4,008,884 | A | 2/1977 | Fitzpatrick et al. |
| 4,018,598 | A | 4/1977 | Markus |
| 4,043,146 | A | 8/1977 | Stegherr et al. |
| 4,052,199 | A | 10/1977 | Mangalick |
| 4,055,390 | A | 10/1977 | Young |
| 4,063,849 | A | 12/1977 | Modianos |
| 4,068,965 | A | 1/1978 | Lichti |
| 4,073,606 | A | 2/1978 | Eller |
| 4,091,970 | A | 5/1978 | Komiyama et al. |
| 4,119,141 | A | 10/1978 | Thut et al. |
| 4,125,146 | A | 11/1978 | Muller |
| 4,126,360 | A | 11/1978 | Miller et al. |
| 4,128,415 | A | 12/1978 | van Linden et al. |
| 4,147,474 | A | 4/1979 | Heimdal et al. |
| 4,169,584 | A | 10/1979 | Mangalick |
| 4,191,486 | A | 3/1980 | Pelton |
| 4,213,742 | A | 7/1980 | Henshaw |
| 4,242,039 | A | 12/1980 | Villard et al. |
| 4,244,423 | A | 1/1981 | Thut et al. |
| 4,286,985 | A | 9/1981 | van Linden et al. |
| 4,305,214 | A | 12/1981 | Hurst |
| 4,322,245 | A | 3/1982 | Claxton |
| 4,338,062 | A | 7/1982 | Neal |
| 4,347,041 | A | 8/1982 | Cooper |
| 4,351,514 | A | 9/1982 | Koch |
| 4,355,789 | A | 10/1982 | Dolzhenkov et al. |
| 4,356,940 | A | 11/1982 | Ansorge |
| 4,360,314 | A | 11/1982 | Pennell |
| 4,370,096 | A | 1/1983 | Church |
| 4,372,541 | A | 2/1983 | Bocourt et al. |
| 4,375,937 | A | 3/1983 | Cooper |
| 4,389,159 | A | 6/1983 | Sarvanne |
| 4,392,888 | A | 7/1983 | Eckert et al. |
| 4,410,299 | A | 10/1983 | Shimoyama |
| 4,419,049 | A | 12/1983 | Gerboth et al. |
| 4,456,424 | A | 6/1984 | Araoka |
| 4,470,846 | A | 9/1984 | Dube |
| 4,474,315 | A | 10/1984 | Gilbert et al. |
| 4,496,393 | A | 1/1985 | Lustenberger |
| 4,504,392 | A | 3/1985 | Groteke |
| 4,509,979 | A | 4/1985 | Bauer |
| 4,530,641 | A | 7/1985 | Gschwender |
| 4,537,624 | A | 8/1985 | Tenhover et al. |
| 4,537,625 | A | 8/1985 | Tenhover et al. |
| 4,545,887 | A | 10/1985 | Arnesen |
| 4,556,419 | A | 12/1985 | Otsuka et al. |
| 4,557,766 | A | 12/1985 | Tenhover et al. |
| 4,586,845 | A | 5/1986 | Morris |
| 4,592,700 | A | 6/1986 | Toguchi et al. |
| 4,594,052 | A | 6/1986 | Niskanen |
| 4,596,510 | A | 6/1986 | Arneth et al. |
| 4,598,899 | A | 7/1986 | Cooper |
| 4,600,222 | A | 7/1986 | Appling |
| 4,607,825 | A | 8/1986 | Briolle et al. |
| 4,609,442 | A | 9/1986 | Tenhover et al. |
| 4,611,790 | A | 9/1986 | Otsuka et al. |
| 4,617,232 | A | 10/1986 | Chandler et al. |
| 4,634,105 | A | 1/1987 | Withers et al. |
| 4,640,666 | A | 2/1987 | Sodergard |
| 4,655,610 | A | 4/1987 | Al-Jaroudi |
| 4,668,166 | A | 5/1987 | Lutz |
| 4,669,953 | A | 6/1987 | Gschwender |
| 4,673,434 | A | 6/1987 | Withers et al. |
| 4,682,585 | A | 7/1987 | Hiltebrandt |
| 4,684,281 | A | 8/1987 | Patterson |
| 4,685,822 | A | 8/1987 | Pelton |
| 4,696,703 | A | 9/1987 | Henderson et al. |
| 4,701,226 | A | 10/1987 | Henderson et al. |
| 4,702,768 | A | 10/1987 | Areauz et al. |
| 4,714,371 | A | 12/1987 | Cuse |
| 4,717,540 | A | 1/1988 | McRae et al. |
| 4,739,974 | A | 4/1988 | Mordue |
| 4,741,664 | A | 5/1988 | Olmstead |
| 4,743,428 | A | 5/1988 | McRae et al. |
| 4,747,583 | A | 5/1988 | Gordon et al. |
| 4,767,230 | A | 8/1988 | Leas, Jr. |
| 4,770,701 | A | 9/1988 | Henderson et al. |
| 4,786,230 | A | 11/1988 | Thut |
| 4,802,656 | A | 2/1989 | Hudault et al. |
| 4,804,168 | A | 2/1989 | Otsuka et al. |
| 4,810,314 | A | 3/1989 | Henderson et al. |
| 4,822,473 | A | 4/1989 | Arnesen |
| 4,834,573 | A | 5/1989 | Asano et al. |
| 4,842,227 | A | 6/1989 | Harrington et al. |
| 4,844,425 | A | 7/1989 | Piras et al. |
| 4,851,296 | A | 7/1989 | Tenhover et al. |
| 4,854,834 | A | 8/1989 | Gschwender et al. |
| 4,859,413 | A | 8/1989 | Harris et al. |
| 4,860,819 | A | 8/1989 | Moscoe et al. |
| 4,867,638 | A | 9/1989 | Handtmann et al. |
| 4,884,786 | A | 12/1989 | Gillespie |
| 4,898,367 | A | 2/1990 | Cooper |
| 4,908,060 | A | 3/1990 | Duenkelmann |
| 4,909,704 | A | 3/1990 | Lutz |
| 4,911,726 | A | 3/1990 | Warkentin |
| 4,923,770 | A | 5/1990 | Grasselli et al. |
| 4,930,986 | A | 6/1990 | Cooper |
| 4,931,091 | A | 6/1990 | Waite et al. |
| 4,940,214 | A | 7/1990 | Gillespie |
| 4,940,384 | A | 7/1990 | Amra et al. |
| 4,954,167 | A | 9/1990 | Cooper |
| 4,967,827 | A | 11/1990 | Campbell |
| 4,973,433 | A | 11/1990 | Gilbert et al. |
| 4,986,736 | A | 1/1991 | Kajiwara et al. |
| 4,989,736 | A | 2/1991 | Andersson et al. |
| 5,015,518 | A | 5/1991 | Sasaki et al. |
| 5,025,198 | A | 6/1991 | Mordue et al. |
| 5,028,211 | A | 7/1991 | Mordue et al. |
| 5,029,821 | A | 7/1991 | Bar-on et al. |
| 5,058,654 | A | 10/1991 | Simmons |
| 5,078,572 | A | 1/1992 | Amra et al. |
| 5,080,715 | A | 1/1992 | Provencher et al. |
| 5,083,753 | A | 1/1992 | Soofi |
| 5,088,893 | A | 2/1992 | Gilbert et al. |
| 5,092,821 | A | 3/1992 | Gilbert et al. |
| 5,098,134 | A | 3/1992 | Monckton |
| 5,099,554 | A | 3/1992 | Cooper |
| 5,114,312 | A | 5/1992 | Stanislao |
| 5,126,047 | A | 6/1992 | Martin et al. |
| 5,131,632 | A | 7/1992 | Olson |
| 5,135,202 | A | 8/1992 | Yamashita et al. |
| 5,143,357 | A | 9/1992 | Gilbert et al. |
| 5,145,322 | A | 9/1992 | Senior, Jr. et al. |
| 5,152,631 | A | 10/1992 | Bauer |
| 5,154,652 | A | 10/1992 | Ecklesdafer |
| 5,158,440 | A | 10/1992 | Cooper et al. |
| 5,162,858 | A | 11/1992 | Shoji et al. |
| 5,165,858 | A | 11/1992 | Gilbert et al. |
| 5,177,304 | A | 1/1993 | Nagel |

(56) References Cited

U.S. PATENT DOCUMENTS

| | | | |
|---|---|---|---|
| 5,191,154 | A | 3/1993 | Nagel |
| 5,192,193 | A | 3/1993 | Cooper et al. |
| 5,202,100 | A | 4/1993 | Nagel et al. |
| 5,203,681 | A | 4/1993 | Cooper |
| 5,209,641 | A | 5/1993 | Hoglund et al. |
| 5,215,448 | A | 6/1993 | Cooper |
| 5,268,020 | A | 12/1993 | Claxton |
| 5,286,163 | A | 2/1994 | Amra et al. |
| 5,298,233 | A | 3/1994 | Nagel |
| 5,301,620 | A | 4/1994 | Nagel et al. |
| 5,303,903 | A | 4/1994 | Butler et al. |
| 5,308,045 | A | 5/1994 | Cooper |
| 5,310,412 | A | 5/1994 | Gilbert et al. |
| 5,318,360 | A | 6/1994 | Langer et al. |
| 5,322,547 | A | 6/1994 | Nagel et al. |
| 5,324,341 | A | 6/1994 | Nagel et al. |
| 5,330,328 | A | 7/1994 | Cooper |
| 5,354,940 | A | 10/1994 | Nagel |
| 5,358,549 | A | 10/1994 | Nagel et al. |
| 5,358,697 | A | 10/1994 | Nagel |
| 5,364,078 | A | 11/1994 | Pelton |
| 5,369,063 | A | 11/1994 | Gee et al. |
| 5,383,651 | A | 1/1995 | Blasen |
| 5,388,633 | A | 2/1995 | Mercer, II et al. |
| 5,395,405 | A | 3/1995 | Nagel et al. |
| 5,399,074 | A | 3/1995 | Nose et al. |
| 5,407,294 | A | 4/1995 | Giannini |
| 5,411,240 | A | 5/1995 | Rapp et al. |
| 5,425,410 | A | 6/1995 | Reynolds |
| 5,431,551 | A | 7/1995 | Aquino et al. |
| 5,435,982 | A | 7/1995 | Wilkinson |
| 5,436,210 | A | 7/1995 | Wilkinson et al. |
| 5,443,572 | A | 8/1995 | Wilkinson et al. |
| 5,454,423 | A | 10/1995 | Tsuchida et al. |
| 5,468,280 | A | 11/1995 | Areaux |
| 5,470,201 | A | 11/1995 | Gilbert et al. |
| 5,484,265 | A | 1/1996 | Horvath et al. |
| 5,489,734 | A | 2/1996 | Nagel et al. |
| 5,491,279 | A | 2/1996 | Robert et al. |
| 5,494,382 | A | 2/1996 | Kloppers |
| 5,495,746 | A | 3/1996 | Sigworth |
| 5,505,143 | A | 4/1996 | Nagel |
| 5,505,435 | A | 4/1996 | Laszlo |
| 5,509,791 | A | 4/1996 | Turner |
| 5,511,766 | A | 4/1996 | Vassilicos |
| 5,520,422 | A | 5/1996 | Friedrich |
| 5,537,940 | A | 7/1996 | Nagel et al. |
| 5,543,558 | A | 8/1996 | Nagel et al. |
| 5,555,822 | A | 9/1996 | Loewen et al. |
| 5,558,501 | A | 9/1996 | Wang et al. |
| 5,558,505 | A | 9/1996 | Mordue et al. |
| 5,571,486 | A | 11/1996 | Robert et al. |
| 5,585,532 | A | 12/1996 | Nagel |
| 5,586,863 | A | 12/1996 | Gilbert et al. |
| 5,591,243 | A | 1/1997 | Colussi et al. |
| 5,597,289 | A | 1/1997 | Thut |
| 5,613,245 | A | 3/1997 | Robert |
| 5,616,167 | A | 4/1997 | Eckert |
| 5,622,481 | A | 4/1997 | Thut |
| 5,629,464 | A | 5/1997 | Bach et al. |
| 5,634,770 | A | 6/1997 | Gilbert et al. |
| 5,640,706 | A | 6/1997 | Nagel et al. |
| 5,640,707 | A | 6/1997 | Nagel et al. |
| 5,640,709 | A | 6/1997 | Nagel et al. |
| 5,655,849 | A | 8/1997 | McEwen et al. |
| 5,660,614 | A | 8/1997 | Waite et al. |
| 5,662,725 | A | 9/1997 | Cooper |
| 5,676,520 | A | 10/1997 | Thut |
| 5,678,244 | A | 10/1997 | Shaw et al. |
| 5,678,807 | A | 10/1997 | Cooper |
| 5,679,132 | A | 10/1997 | Rauenzahn et al. |
| 5,685,701 | A | 11/1997 | Chandler et al. |
| 5,690,888 | A | 11/1997 | Robert |
| 5,695,732 | A | 12/1997 | Sparks et al. |
| 5,716,195 | A | 2/1998 | Thut |
| 5,717,149 | A | 2/1998 | Nagel et al. |
| 5,718,416 | A | 2/1998 | Flisakowski et al. |
| 5,735,668 | A | 4/1998 | Klein |
| 5,735,935 | A | 4/1998 | Areaux |
| 5,741,422 | A | 4/1998 | Eichenmiller et al. |
| 5,744,093 | A | 4/1998 | Davis |
| 5,744,117 | A | 4/1998 | Wilkinson et al. |
| 5,745,861 | A | 4/1998 | Bell et al. |
| 5,755,847 | A | 5/1998 | Quayle |
| 5,758,712 | A | 6/1998 | Pederson |
| 5,772,324 | A | 6/1998 | Falk |
| 5,776,420 | A | 7/1998 | Nagel |
| 5,785,494 | A | 7/1998 | Vild et al. |
| 5,842,832 | A | 12/1998 | Thut |
| 5,846,481 | A | 12/1998 | Tilak |
| 5,858,059 | A | 1/1999 | Abramovich et al. |
| 5,863,314 | A | 1/1999 | Morando |
| 5,866,095 | A | 2/1999 | McGeever et al. |
| 5,875,385 | A | 2/1999 | Stephenson et al. |
| 5,935,528 | A | 8/1999 | Stephenson et al. |
| 5,944,496 | A | 8/1999 | Cooper |
| 5,947,705 | A | 9/1999 | Mordue et al. |
| 5,948,352 | A | 9/1999 | Jagt et al. |
| 5,951,243 | A | 9/1999 | Cooper |
| 5,961,285 | A | 10/1999 | Meneice et al. |
| 5,963,580 | A | 10/1999 | Eckert |
| 5,992,230 | A | 11/1999 | Scarpa et al. |
| 5,993,726 | A | 11/1999 | Huang |
| 5,993,728 | A | 11/1999 | Vild |
| 6,007,313 | A * | 12/1999 | Sigel .................. F04D 29/0413 417/424.1 |
| 6,019,576 | A | 2/2000 | Thut |
| 6,027,685 | A | 2/2000 | Cooper |
| 6,036,745 | A | 3/2000 | Gilbert et al. |
| 6,074,455 | A | 6/2000 | van Linden et al. |
| 6,082,965 | A | 7/2000 | Morando |
| 6,093,000 | A | 7/2000 | Cooper |
| 6,096,109 | A | 8/2000 | Nagel et al. |
| 6,113,154 | A | 9/2000 | Thut |
| 6,123,523 | A | 9/2000 | Cooper |
| 6,152,691 | A | 11/2000 | Thut |
| 6,168,753 | B1 | 1/2001 | Morando |
| 6,187,096 | B1 | 2/2001 | Thut |
| 6,199,836 | B1 | 3/2001 | Rexford et al. |
| 6,217,823 | B1 | 4/2001 | Vild et al. |
| 6,231,639 | B1 | 5/2001 | Eichenmiller |
| 6,250,881 | B1 | 6/2001 | Mordue et al. |
| 6,254,340 | B1 | 7/2001 | Vild et al. |
| 6,270,717 | B1 | 8/2001 | Tremblay et al. |
| 6,280,157 | B1 | 8/2001 | Cooper |
| 6,293,759 | B1 | 9/2001 | Thut |
| 6,303,074 | B1 | 10/2001 | Cooper |
| 6,345,964 | B1 | 2/2002 | Cooper |
| 6,354,796 | B1 | 3/2002 | Morando |
| 6,358,467 | B1 | 3/2002 | Mordue |
| 6,364,930 | B1 | 4/2002 | Kos |
| 6,371,723 | B1 | 4/2002 | Grant et al. |
| 6,398,525 | B1 | 6/2002 | Cooper |
| 6,439,860 | B1 | 8/2002 | Greer |
| 6,451,247 | B1 | 9/2002 | Mordue et al. |
| 6,457,940 | B1 | 10/2002 | Lehman |
| 6,457,950 | B1 | 10/2002 | Cooper et al. |
| 6,464,458 | B2 | 10/2002 | Vild et al. |
| 6,474,962 | B1 | 11/2002 | Allen et al. |
| 6,495,948 | B1 | 12/2002 | Garrett, III |
| 6,497,559 | B1 | 12/2002 | Grant |
| 6,500,228 | B1 | 12/2002 | Klingensmith et al. |
| 6,503,292 | B2 | 1/2003 | Klingensmith et al. |
| 6,524,066 | B2 | 2/2003 | Thut |
| 6,533,535 | B2 | 3/2003 | Thut |
| 6,551,060 | B2 | 4/2003 | Mordue et al. |
| 6,562,286 | B1 | 5/2003 | Lehman |
| 6,656,415 | B2 | 12/2003 | Kos |
| 6,679,936 | B2 | 1/2004 | Quackenbush |
| 6,689,310 | B1 | 2/2004 | Cooper |
| 6,709,234 | B2 | 3/2004 | Gilbert et al. |
| 6,723,276 | B1 | 4/2004 | Cooper |
| 6,805,834 | B2 | 10/2004 | Thut |
| 6,843,640 | B2 | 1/2005 | Mordue et al. |

(56) References Cited

U.S. PATENT DOCUMENTS

| | | | | |
|---|---|---|---|---|
| 6,848,497 | B2 | 2/2005 | Sale et al. | |
| 6,869,271 | B2 | 3/2005 | Gilbert et al. | |
| 6,869,564 | B2 | 3/2005 | Gilbert et al. | |
| 6,881,030 | B2 | 4/2005 | Thut | |
| 6,887,424 | B2 | 5/2005 | Ohno et al. | |
| 6,887,425 | B2 | 5/2005 | Mordue et al. | |
| 6,902,696 | B2 | 6/2005 | Klingensmith et al. | |
| 7,037,462 | B2 | 5/2006 | Klingensmith et al. | |
| 7,074,361 | B2 | 7/2006 | Carolla et al. | |
| 7,083,758 | B2 | 8/2006 | Tremblay | |
| 7,131,482 | B2 | 11/2006 | Vincent et al. | |
| 7,157,043 | B2 | 1/2007 | Neff | |
| 7,204,954 | B2 | 4/2007 | Mizuno | |
| 7,273,582 | B2 | 9/2007 | Mordue | |
| 7,279,128 | B2 | 10/2007 | Kennedy et al. | |
| 7,326,028 | B2 | 2/2008 | Morando | |
| 7,402,276 | B2 | 7/2008 | Cooper | |
| 7,470,392 | B2 | 12/2008 | Cooper | |
| 7,476,357 | B2 | 1/2009 | Thut | |
| 7,481,966 | B2 | 1/2009 | Mizuno | |
| 7,497,988 | B2 | 3/2009 | Thut | |
| 7,507,365 | B2 | 3/2009 | Thut | |
| 7,507,367 | B2 | 3/2009 | Cooper | |
| 7,543,605 | B1 | 6/2009 | Morando | |
| 7,731,891 | B2 | 6/2010 | Cooper | |
| 7,771,171 | B2 | 8/2010 | Mohr | |
| 7,784,999 | B1 | 8/2010 | Lott | |
| 7,841,379 | B1 | 11/2010 | Evans | |
| 7,896,617 | B1 | 3/2011 | Morando | |
| 7,906,068 | B2 | 3/2011 | Cooper | |
| 8,075,837 | B2 | 12/2011 | Cooper | |
| 8,110,141 | B2 | 2/2012 | Cooper | |
| 8,137,023 | B2 | 3/2012 | Greer | |
| 8,142,145 | B2 | 3/2012 | Thut | |
| 8,178,037 | B2 | 5/2012 | Cooper | |
| 8,328,540 | B2 | 12/2012 | Wang | |
| 8,333,921 | B2 | 12/2012 | Thut | |
| 8,337,746 | B2 | 12/2012 | Cooper | |
| 8,361,379 | B2 | 1/2013 | Cooper | |
| 8,366,993 | B2 | 2/2013 | Cooper | |
| 8,409,495 | B2 | 4/2013 | Cooper | |
| 8,440,135 | B2 | 5/2013 | Cooper | |
| 8,444,911 | B2 * | 5/2013 | Cooper | F04D 7/065 415/216.1 |
| 8,449,814 | B2 | 5/2013 | Cooper | |
| 8,475,594 | B2 | 7/2013 | Bright et al. | |
| 8,475,708 | B2 | 7/2013 | Cooper | |
| 8,480,950 | B2 | 7/2013 | Jetten et al. | |
| 8,501,084 | B2 | 8/2013 | Cooper | |
| 8,524,146 | B2 | 9/2013 | Cooper | |
| 8,529,828 | B2 | 9/2013 | Cooper | |
| 8,535,603 | B2 | 9/2013 | Cooper | |
| 8,580,218 | B2 | 11/2013 | Turenne et al. | |
| 8,613,884 | B2 | 12/2013 | Cooper | |
| 8,714,914 | B2 | 5/2014 | Cooper | |
| 8,753,563 | B2 | 6/2014 | Cooper | |
| 8,840,359 | B2 | 9/2014 | Vick et al. | |
| 8,899,932 | B2 | 12/2014 | Tetkoskie et al. | |
| 8,915,830 | B2 | 12/2014 | March et al. | |
| 8,920,680 | B2 | 12/2014 | Mao | |
| 9,011,761 | B2 | 4/2015 | Cooper | |
| 9,017,597 | B2 | 4/2015 | Cooper | |
| 9,034,244 | B2 | 5/2015 | Cooper | |
| 9,057,376 | B2 | 6/2015 | Thut | |
| 9,074,601 | B1 | 7/2015 | Thut | |
| 9,080,577 | B2 * | 7/2015 | Cooper | C04B 37/025 |
| 9,108,224 | B2 | 8/2015 | Schererz et al. | |
| 9,108,244 | B2 | 8/2015 | Cooper | |
| 9,156,087 | B2 | 10/2015 | Cooper | |
| 9,193,532 | B2 | 11/2015 | March et al. | |
| 9,205,490 | B2 | 12/2015 | Cooper | |
| 9,234,520 | B2 | 1/2016 | Morando | |
| 9,273,376 | B2 | 3/2016 | Lutes et al. | |
| 9,328,615 | B2 | 5/2016 | Cooper | |
| 9,377,028 | B2 | 6/2016 | Cooper | |
| 9,382,599 | B2 | 7/2016 | Cooper | |
| 9,383,140 | B2 | 7/2016 | Cooper | |
| 9,388,925 | B2 | 7/2016 | Juarez | |
| 9,409,232 | B2 | 8/2016 | Cooper | |
| 9,410,744 | B2 | 8/2016 | Cooper | |
| 9,422,942 | B2 * | 8/2016 | Cooper | F04D 29/043 |
| 9,435,343 | B2 | 9/2016 | Cooper | |
| 9,464,636 | B2 | 10/2016 | Cooper | |
| 9,470,239 | B2 | 10/2016 | Cooper | |
| 9,476,644 | B2 | 10/2016 | Howitt et al. | |
| 9,481,035 | B2 | 11/2016 | Cooper | |
| 9,481,918 | B2 | 11/2016 | Vild et al. | |
| 9,482,469 | B2 | 11/2016 | Cooper | |
| 9,494,366 | B1 | 11/2016 | Thut | |
| 9,506,129 | B2 | 11/2016 | Cooper | |
| 9,506,346 | B2 | 11/2016 | Bright et al. | |
| 9,532,670 | B2 * | 1/2017 | Vaessen | F16B 5/0064 |
| 9,566,645 | B2 | 2/2017 | Cooper | |
| 9,581,388 | B2 | 2/2017 | Cooper | |
| 9,587,883 | B2 | 3/2017 | Cooper | |
| 9,632,670 | B2 * | 4/2017 | Wu | H04L 67/60 |
| 9,643,247 | B2 | 5/2017 | Cooper et al. | |
| 9,657,578 | B2 | 5/2017 | Cooper | |
| 9,855,600 | B2 | 1/2018 | Cooper | |
| 9,862,026 | B2 | 1/2018 | Cooper | |
| 9,903,383 | B2 | 2/2018 | Cooper | |
| 9,909,808 | B2 | 3/2018 | Cooper | |
| 9,920,767 | B2 * | 3/2018 | Klain | F04D 29/061 |
| 9,925,587 | B2 | 3/2018 | Cooper | |
| 9,951,777 | B2 | 4/2018 | Morando et al. | |
| 9,970,442 | B2 | 5/2018 | Tipton | |
| 9,982,945 | B2 | 5/2018 | Cooper | |
| 10,052,688 | B2 | 8/2018 | Cooper | |
| 10,072,897 | B2 | 9/2018 | Cooper | |
| 10,126,058 | B2 | 11/2018 | Cooper | |
| 10,126,059 | B2 | 11/2018 | Cooper | |
| 10,138,892 | B2 | 11/2018 | Cooper | |
| 10,195,664 | B2 | 2/2019 | Cooper et al. | |
| 10,267,314 | B2 | 4/2019 | Cooper | |
| 10,274,256 | B2 | 4/2019 | Cooper | |
| 10,302,361 | B2 | 5/2019 | Cooper | |
| 10,307,821 | B2 | 6/2019 | Cooper | |
| 10,309,725 | B2 | 6/2019 | Cooper | |
| 10,322,451 | B2 | 6/2019 | Cooper | |
| 10,345,045 | B2 | 7/2019 | Cooper | |
| 10,352,620 | B2 | 7/2019 | Cooper | |
| 10,428,821 | B2 | 10/2019 | Cooper | |
| 10,458,708 | B2 | 10/2019 | Cooper | |
| 10,465,688 | B2 | 11/2019 | Cooper | |
| 10,562,097 | B2 | 2/2020 | Cooper | |
| 10,570,745 | B2 | 2/2020 | Cooper | |
| 10,641,270 | B2 | 5/2020 | Cooper | |
| 10,641,279 | B2 | 5/2020 | Cooper | |
| 10,675,679 | B2 | 6/2020 | Cooper | |
| 11,020,798 | B2 | 5/2021 | Cooper | |
| 11,098,719 | B2 | 8/2021 | Cooper | |
| 11,098,720 | B2 | 8/2021 | Cooper | |
| 11,103,920 | B2 | 8/2021 | Cooper | |
| 11,130,173 | B2 | 9/2021 | Cooper | |
| 11,149,747 | B2 * | 10/2021 | Cooper | F04D 29/043 |
| 11,167,345 | B2 | 11/2021 | Cooper | |
| 11,185,916 | B2 | 11/2021 | Cooper | |
| 11,286,939 | B2 | 3/2022 | Cooper | |
| 11,358,216 | B2 | 6/2022 | Cooper | |
| 11,358,217 | B2 | 6/2022 | Cooper | |
| 11,391,293 | B2 | 7/2022 | Cooper | |
| 11,471,938 | B2 | 10/2022 | Fontana et al. | |
| 11,519,414 | B2 | 12/2022 | Cooper | |
| 2001/0000465 | A1 | 4/2001 | Thut | |
| 2002/0089099 | A1 | 7/2002 | Denning | |
| 2002/0102159 | A1 | 8/2002 | Thut | |
| 2002/0146313 | A1 | 10/2002 | Thut | |
| 2002/0185790 | A1 | 12/2002 | Klingensmith et al. | |
| 2002/0185794 | A1 | 12/2002 | Vincent | |
| 2003/0047850 | A1 | 3/2003 | Areaux | |
| 2003/0075844 | A1 | 4/2003 | Mordue et al. | |
| 2003/0082052 | A1 | 5/2003 | Gilbert et al. | |
| 2003/0151176 | A1 | 8/2003 | Ohno | |
| 2003/0201583 | A1 | 10/2003 | Klingensmith | |

(56) References Cited

U.S. PATENT DOCUMENTS

| | | | |
|---|---|---|---|
| 2004/0050525 | A1 | 3/2004 | Kennedy et al. |
| 2004/0076533 | A1 | 4/2004 | Cooper |
| 2004/0096330 | A1 | 5/2004 | Gilbert et al. |
| 2004/0115079 | A1 | 6/2004 | Cooper |
| 2004/0245684 | A1 | 12/2004 | Kojo et al. |
| 2004/0262825 | A1 | 12/2004 | Cooper |
| 2005/0013713 | A1 | 1/2005 | Cooper |
| 2005/0013714 | A1 | 1/2005 | Cooper |
| 2005/0013715 | A1 | 1/2005 | Cooper |
| 2005/0053499 | A1 | 3/2005 | Cooper |
| 2005/0077730 | A1 | 4/2005 | Thut |
| 2005/0081607 | A1 | 4/2005 | Patel et al. |
| 2005/0116398 | A1 | 6/2005 | Tremblay |
| 2006/0180963 | A1 | 8/2006 | Thut |
| 2007/0253807 | A1 | 11/2007 | Cooper |
| 2008/0163999 | A1 | 7/2008 | Hymas et al. |
| 2008/0202644 | A1 | 8/2008 | Grassi |
| 2008/0211147 | A1 | 9/2008 | Cooper |
| 2008/0213111 | A1 | 9/2008 | Cooper |
| 2008/0230966 | A1 | 9/2008 | Cooper |
| 2008/0253905 | A1 | 10/2008 | Morando et al. |
| 2008/0304970 | A1 | 12/2008 | Cooper |
| 2008/0314548 | A1 | 12/2008 | Cooper |
| 2009/0054167 | A1 | 2/2009 | Cooper |
| 2009/0140013 | A1 | 6/2009 | Cooper |
| 2009/0269191 | A1 | 10/2009 | Cooper |
| 2010/0104415 | A1 | 4/2010 | Morando |
| 2010/0200354 | A1 | 8/2010 | Yagi et al. |
| 2011/0133374 | A1 | 6/2011 | Cooper |
| 2011/0140318 | A1 | 6/2011 | Reeves et al. |
| 2011/0140319 | A1 | 6/2011 | Cooper |
| 2011/0140619 | A1 | 6/2011 | Lin et al. |
| 2011/0142603 | A1 | 6/2011 | Cooper |
| 2011/0142606 | A1 | 6/2011 | Cooper |
| 2011/0148012 | A1 | 6/2011 | Cooper |
| 2011/0163486 | A1 | 7/2011 | Cooper |
| 2011/0210232 | A1 | 9/2011 | Cooper |
| 2011/0220771 | A1 | 9/2011 | Cooper |
| 2011/0227338 | A1 | 9/2011 | Pollack |
| 2011/0303706 | A1 | 12/2011 | Cooper |
| 2012/0003099 | A1 | 1/2012 | Tetkoskie |
| 2012/0163959 | A1 | 6/2012 | Morando |
| 2013/0105102 | A1 | 5/2013 | Cooper |
| 2013/0142625 | A1 | 6/2013 | Cooper |
| 2013/0214014 | A1 | 8/2013 | Cooper |
| 2013/0224038 | A1 | 8/2013 | Tetkoskie et al. |
| 2013/0292426 | A1 | 11/2013 | Cooper |
| 2013/0292427 | A1 | 11/2013 | Cooper |
| 2013/0299524 | A1 | 11/2013 | Cooper |
| 2013/0299525 | A1 | 11/2013 | Cooper |
| 2013/0306687 | A1 | 11/2013 | Cooper |
| 2013/0334744 | A1 | 12/2013 | Tremblay |
| 2013/0343904 | A1 | 12/2013 | Cooper |
| 2014/0008849 | A1 | 1/2014 | Cooper |
| 2014/0041252 | A1 | 2/2014 | Vild et al. |
| 2014/0044520 | A1 | 2/2014 | Tipton |
| 2014/0083253 | A1 | 3/2014 | Lutes et al. |
| 2014/0210144 | A1 | 7/2014 | Torres et al. |
| 2014/0232048 | A1 | 8/2014 | Howitt et al. |
| 2014/0252697 | A1 | 9/2014 | Rauch |
| 2014/0252701 | A1 | 9/2014 | Cooper |
| 2014/0261800 | A1 | 9/2014 | Cooper |
| 2014/0263482 | A1 | 9/2014 | Cooper |
| 2014/0265068 | A1 | 9/2014 | Cooper |
| 2014/0271219 | A1 | 9/2014 | Cooper |
| 2014/0363309 | A1 | 12/2014 | Henderson et al. |
| 2015/0069679 | A1 | 3/2015 | Henderson et al. |
| 2015/0184311 | A1 | 7/2015 | Turenne |
| 2015/0192364 | A1 | 7/2015 | Cooper |
| 2015/0217369 | A1 | 8/2015 | Cooper |
| 2015/0219111 | A1 | 8/2015 | Cooper |
| 2015/0219112 | A1 | 8/2015 | Cooper |
| 2015/0219113 | A1 | 8/2015 | Cooper |
| 2015/0219114 | A1 | 8/2015 | Cooper |
| 2015/0224574 | A1 | 8/2015 | Cooper |
| 2015/0252807 | A1 | 9/2015 | Cooper |
| 2015/0285557 | A1 | 10/2015 | Cooper |
| 2015/0285558 | A1 | 10/2015 | Cooper |
| 2015/0323256 | A1 | 11/2015 | Cooper |
| 2015/0328682 | A1 | 11/2015 | Cooper |
| 2015/0328683 | A1 | 11/2015 | Cooper |
| 2016/0031007 | A1 | 2/2016 | Cooper |
| 2016/0040265 | A1 | 2/2016 | Cooper |
| 2016/0047602 | A1 | 2/2016 | Cooper |
| 2016/0053762 | A1 | 2/2016 | Cooper |
| 2016/0053814 | A1 | 2/2016 | Cooper |
| 2016/0082507 | A1 | 3/2016 | Cooper |
| 2016/0089718 | A1 | 3/2016 | Cooper |
| 2016/0091251 | A1 | 3/2016 | Cooper |
| 2016/0116216 | A1 | 4/2016 | Schlicht et al. |
| 2016/0221855 | A1 | 8/2016 | Retorick et al. |
| 2016/0250686 | A1 | 9/2016 | Cooper |
| 2016/0265535 | A1 | 9/2016 | Cooper |
| 2016/0305711 | A1 | 10/2016 | Cooper |
| 2016/0320129 | A1 | 11/2016 | Cooper |
| 2016/0320130 | A1 | 11/2016 | Cooper |
| 2016/0320131 | A1 | 11/2016 | Cooper |
| 2016/0346836 | A1 | 12/2016 | Henderson et al. |
| 2016/0348973 | A1 | 12/2016 | Cooper |
| 2016/0348974 | A1 | 12/2016 | Cooper |
| 2016/0348975 | A1 | 12/2016 | Cooper |
| 2017/0037852 | A1 | 2/2017 | Bright et al. |
| 2017/0038146 | A1 | 2/2017 | Cooper |
| 2017/0045298 | A1 | 2/2017 | Cooper |
| 2017/0056973 | A1 | 3/2017 | Tremblay et al. |
| 2017/0082368 | A1 | 3/2017 | Cooper |
| 2017/0106435 | A1 | 4/2017 | Vincent |
| 2017/0106441 | A1 | 4/2017 | Vincent |
| 2017/0130298 | A1 | 5/2017 | Teranishi et al. |
| 2017/0167793 | A1 | 6/2017 | Cooper et al. |
| 2017/0198721 | A1 | 7/2017 | Cooper |
| 2017/0219289 | A1 | 8/2017 | Williams et al. |
| 2017/0241713 | A1 | 8/2017 | Henderson et al. |
| 2017/0246681 | A1 | 8/2017 | Tipton et al. |
| 2017/0276430 | A1 | 9/2017 | Cooper |
| 2018/0058465 | A1 | 3/2018 | Cooper |
| 2018/0111189 | A1 | 4/2018 | Cooper |
| 2018/0178281 | A1 | 6/2018 | Cooper |
| 2018/0195513 | A1 | 7/2018 | Cooper |
| 2018/0311726 | A1 | 11/2018 | Cooper |
| 2019/0032675 | A1 | 1/2019 | Cooper |
| 2019/0270134 | A1 | 9/2019 | Cooper |
| 2019/0293089 | A1 | 9/2019 | Cooper |
| 2019/0351481 | A1 | 11/2019 | Tetkoskie |
| 2019/0360491 | A1 | 11/2019 | Cooper |
| 2019/0360492 | A1 | 11/2019 | Cooper |
| 2019/0368494 | A1 | 12/2019 | Cooper |
| 2020/0130050 | A1 | 4/2020 | Cooper |
| 2020/0130051 | A1 | 4/2020 | Cooper |
| 2020/0130052 | A1 | 4/2020 | Cooper |
| 2020/0130053 | A1 | 4/2020 | Cooper |
| 2020/0130054 | A1 | 4/2020 | Cooper |
| 2020/0182247 | A1 | 6/2020 | Cooper |
| 2020/0182248 | A1 | 6/2020 | Cooper |
| 2020/0256350 | A1 | 8/2020 | Cooper |
| 2020/0360987 | A1 | 11/2020 | Cooper |
| 2020/0360988 | A1 | 11/2020 | Cooper |
| 2020/0360989 | A1 | 11/2020 | Cooper |
| 2020/0360990 | A1 | 11/2020 | Cooper |
| 2020/0362865 | A1 | 11/2020 | Cooper |
| 2020/0363128 | A1 | 11/2020 | Cooper |
| 2021/0199115 | A1 | 7/2021 | Cooper |
| 2021/0254622 | A1 | 8/2021 | Cooper |
| 2022/0080498 | A1 | 3/2022 | Cooper |
| 2022/0193764 | A1 | 6/2022 | Cooper |
| 2022/0213895 | A1 | 7/2022 | Cooper |
| 2022/0234099 | A1 | 7/2022 | Cooper |
| 2022/0381246 | A1 | 12/2022 | Cooper |
| 2023/0001474 | A1 | 1/2023 | Cooper |

FOREIGN PATENT DOCUMENTS

| | | |
|---|---|---|
| CA | 2244251 | 6/1998 |
| CA | 2305865 | 2/2000 |

(56) References Cited

FOREIGN PATENT DOCUMENTS

| | | | |
|---|---|---|---|
| CA | 2176475 | | 7/2005 |
| CA | 2924572 | | 4/2015 |
| CH | 392268 | | 9/1965 |
| CN | 102943761 | | 2/2013 |
| CN | 103511331 | A | 1/2014 |
| DE | 1800446 | | 12/1969 |
| DE | 19541093 | | 5/1997 |
| DE | 19614350 | | 10/1997 |
| DE | 102006051814 | | 7/2008 |
| EP | 168250 | | 1/1986 |
| EP | 665378 | | 8/1995 |
| EP | 1019635 | | 6/2006 |
| GB | 543607 | | 3/1942 |
| GB | 942648 | | 11/1963 |
| GB | 1185314 | | 3/1970 |
| GB | 1565911 | A | 4/1980 |
| GB | 1575991 | | 10/1980 |
| GB | 2122260 | | 1/1984 |
| GB | 2193257 | | 2/1988 |
| GB | 2217784 | | 3/1989 |
| GB | 2289919 | | 12/1995 |
| JP | 58048796 | | 3/1983 |
| JP | 63104773 | | 5/1988 |
| JP | 11-270799 | | 10/1999 |
| JP | 5112837 | | 1/2013 |
| MX | 227385 | | 4/2005 |
| NO | 90756 | | 1/1959 |
| SU | 416401 | | 2/1974 |
| SU | 773312 | | 10/1980 |
| WO | 199808990 | | 3/1998 |
| WO | 199825031 | | 6/1998 |
| WO | 200009889 | | 2/2000 |
| WO | 2002012147 | | 2/2002 |
| WO | 2004029307 | | 4/2004 |
| WO | 2010147932 | | 12/2010 |
| WO | 2014031484 | A2 | 2/2014 |
| WO | 2014055082 | | 4/2014 |
| WO | 2014150503 | | 9/2014 |
| WO | 2014185971 | | 11/2014 |

OTHER PUBLICATIONS

Document No. 504217: Excerpts from “Pyrotek Inc.’s Motion for Summary Judgment of Invalidity and Unenforceability of U.S. Pat. No. 7,402,276,” Oct. 2, 2009.

Document No. 505026: Excerpts from “MMEI’s Response to Pyrotek’s Motion for Summary Judgment of Invalidity or Enforceability of U.S. Pat. No. 7,402,276,” Oct. 9, 2009.

Document No. 507689: Excerpts from “MMEI’s Pre-Hearing Brief and Supplemental Motion for Summary Judgment of Infringement of Claims 3, 4, 15, 17-20, 26, 28 and 29 of the ’074 Patent and Motion for Reconsideration of the Validity of Claims 7-9 of the ’276 Patent,” Nov. 4, 2009.

Document No. 517158: Excerpts from “Reasoned Award,” Feb. 19, 2010.

Document No. 525055: Excerpts from “Molten Metal Equipment Innovations, Inc.’s Reply Brief in Support of Application to Confirm Arbitration Award and Opposition to Motion to Vacate,” May 12, 2010.

USPTO; Notice of Reissue Examination Certificate dated Aug. 27, 2001 in U.S. Appl. No. 90/005,910.

* cited by examiner

TENSIONED SUPPORT POST AND OTHER MOLTEN METAL DEVICES

CROSS REFERENCE TO RELATED APPLICATIONS

This application is a continuation of, and claims priority to U.S. patent application Ser. No. 16/195,678, filed Nov. 19, 2018, and entitled "Tensioned Support Posts and Other Molten Metal Devices" which claims priority to U.S. Provisional Application 62/588,090, filed Nov. 17, 2017, and entitled "Tensioned Support Post and Other Molten Metal Devices," each of the disclosures of which are incorporated herein by reference. This Application incorporates by reference U.S. application Ser. No. 15/406,515, filed Jan. 13, 2017, and entitled "Tensioned Support Shaft and Other Molten Metal Devices," to the extent such application does not conflict with the present disclosure.

FIELD

The invention relates to tensioned support posts and other components, such as a reinforced support post that may be used in pumps for pumping molten metal.

BACKGROUND

As used herein, the term "molten metal" means any metal or combination of metals in liquid form, such as aluminum, copper, iron, zinc, and alloys thereof. The term "gas" means any gas or combination of gases, including argon, nitrogen, chlorine, fluorine, Freon, and helium, which are released into molten metal.

Known molten-metal pumps include (a) a pump base (also called a housing or casing), (b) one or more inlets (an inlet being an opening in the housing to allow molten metal to enter a pump chamber), (c) a pump chamber of any suitable configuration, which is an open area formed within the housing, (d) a discharge, which is a channel or conduit of any structure or type communicating with the pump chamber (in an axial pump the chamber and discharge may be the same structure or different areas of the same structure) and that leads from the pump chamber to (e) an outlet, which is an opening formed in the exterior of the housing through which molten metal exits the casing. An impeller, also called a rotor, is mounted at least partially in the pump chamber and is connected to a drive system. The drive shaft is typically (a) an impeller shaft having one end connected to the impeller and the other end connected to a coupling, and (b) a motor shaft having one end connected to a motor (such as an electric, hydraulic, or pneumatic motor) and the other end connected to the coupling. Often, the impeller (or rotor) shaft is comprised of graphite and/or ceramic (such as silicon carbide), the motor shaft is comprised of steel, and the coupling is comprised of steel.

As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber.

Some molten metal pumps do not include a base or support posts and are sized to fit into a structure by which molten metal is pumped. Most pumps have a metal platform, or superstructure, that is either supported by a plurality of support posts attached to the pump base, or supported by another structure if there is no pump base. The motor is positioned on the superstructure, if a superstructure is used.

This application incorporates by reference the portions of the following publications that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S. Pat. No. 6,124,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser. No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Circulation pumps may be used in any vessel, such as in a reverberatory furnace having an external well. The well is usually an extension of the charging well, in which scrap metal is charged (i.e., added).

Standard transfer pumps are generally used to transfer molten metal from one structure to another structure such as a ladle or another furnace. A standard transfer pump has a riser tube connected to a pump discharge and supported by the superstructure. As molten metal is pumped it is pushed up the riser tube (sometimes called a metal-transfer conduit) and out of the riser tube, which generally has an elbow at its upper end, so molten metal is released into a different vessel from which the pump is positioned. Alternate transfer pumping systems can pump molten metal upwards to a launder, which can greatly eliminate turbulence and resulting dross.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of both of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber. The gas may also be released into any suitable location in a molten metal bath.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the impeller.

Generally a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is preferably used in conjunction with the scrap melter to circulate the molten metal in order to maintain a relatively constant temperature within the molten metal.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, or other ceramic material capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Ceramic, however, is more resistant to corrosion by molten aluminum than graphite. It would therefore be advantageous to develop vertical members used in a molten metal device that are comprised of ceramic, but less costly than solid ceramic members, and less prone to breakage than normal ceramic.

SUMMARY

Devices are disclosed that have increased resistance to breakage. One device comprises at least one tension rod positioned inside an outer core. The tension rod and optionally other structures apply tension (or compressive force) to the outer core in order to make it more resistant to breakage. In this disclosure, the tension rod is preferably tightened by in part using a molten metal pump superstructure (also called a platform) that supports the motor. All or most of the outer core is on the side of the superstructure opposite the surface on which the pump is positioned.

The tension rod may be affixed to the outer core by being affixed to a first block of material at the top of the outer core, and affixed to a second block of material at the bottom of the outer core. When the tension rod is tightened, it draws the first block and the second block together which applies axial compressive force to the outer core.

The outer core can be compressed in any suitable manner. If the first block and second block are utilized, the tension rod may be affixed to each by a bolt or other device attached to, and preferably having an area at least about 30% to 150% greater than the cross-sectional area of the tension rod. The bolt or other device could be inside or outside of the first block and/or second block.

A device according to this disclosure, such as a support post or impeller shaft, includes an outer core made of structural refractory material, such as graphite, graphitized carbon, clay-bonded graphite, carbon-bonded graphite, silicon carbide, ceramics, or the like. The outer core has a first end and a second end and the tension rod includes a first end and a second end. At least one end of the tension rod can extend beyond and terminate outside of the one end of the outer core. Either the first end or the second end of the tension rod, or both, can be tightened against a superstructure. This puts the outer core under compression, and makes the outer core more resistant to breakage. By using the system of the invention, it is also possible to use a thinner cross-sectional outer core wall, thereby reducing material costs.

Also disclosed is a device, such as a support post, for use in molten metal that includes a reinforcement section to strengthen the device and help alleviate breakage.

Also disclosed are molten metal pumps that include one or more devices disclosed herein.

DETAILED DESCRIPTION OF PREFERRED EMBODIMENTS

For any device described herein, any of the components that contact the molten metal are preferably formed by a material that can withstand the molten metal environment. Preferred materials are oxidation-resistant graphite and ceramic, such as silicon carbide.

Figure 1:
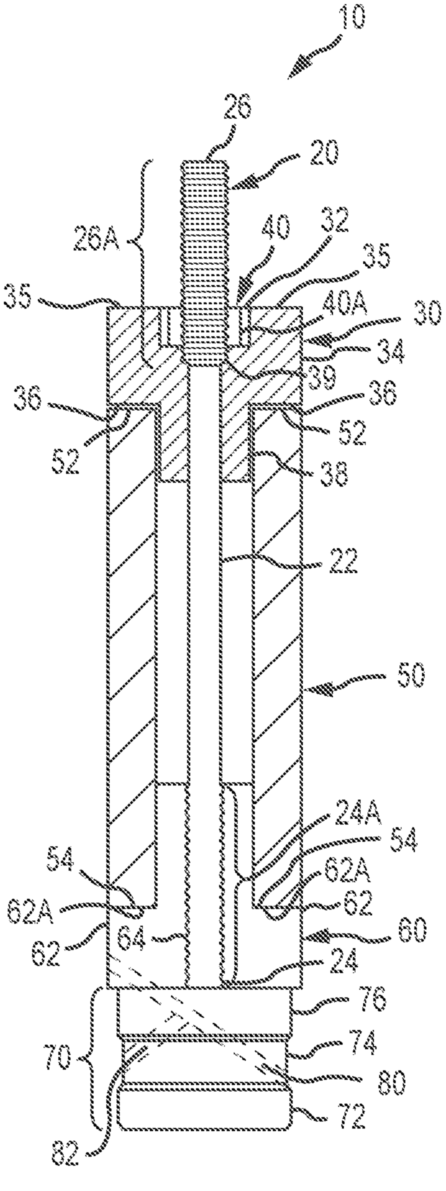
FIG. 1 is a side, partial cross-sectional view of a support post according to this disclosure.

FIG. 1 shows a support post 10 in accordance with aspects of the disclosure. Shaft has an outer core 50 that has axial tension applied to it to make outer core 50 more resistant to breakage. Similar techniques, however, may be used to tension rotor shafts or other elongate molten metal pump components. Shaft 10 has a tension rod 20, a top support block 30, a bottom support block 60, an outer core 50, and a bottom 70.

Tension rod 20 is preferably comprised of steel and has a body 24, a first end 24 and a second end 26. As shown, tension rod 20 is threaded along about 5% to 25% of its length starting at first end 24 and moving upward, and along about 10% to 25% of its length starting at second end 26 and moving downward. The threaded portion 24A juxtaposed end 24 is preferably configured to be threaded into a channel 64 in second end 60 and into channel 76A in section 76. Portion 24A need only have sufficient threads to anchor it in second end 60 and/or section 76. Alternatively, shaft 20 need not be threaded into second end 60 and/or section 76, but could instead pass through them and be retained by nut 85 (or other suitable fastener) in section 76 or section 74.

Threaded portion 26A can optionally be threaded partially into bore 39 of top block 30. Nut 40 and nut 120 are threaded onto portion 26A as further described.

Tension rod 20 includes a top, threaded portion 26A that (as shown) threaded partially into top block 30. Top (or first) block 30 has an upper portion 34, a top surface 35, an opening 32, a sleeve 38, an internal wall surface 36, and a passage 39. Upper portion 34 is on top of and outside of outer core 50, and surface 36 rests on the top 52 to apply axial tension to outer core 50. Passage 39 is configured so rod 20 can pass therethrough. Opening 32 is formed in top surface 35, is preferably about 1.5 to 2.5 times the diameter of rod 20, and extends into top block 30 from upper surface 35 by about 1" to 3", although opening 32 can be of any suitable dimension. Sleeve 38 fits inside of outer coating 50 and extends downward about 10-30% of the length (although any suitable distance would work, or top bock 30 could be stabilized in another manner) of outer coating 50 in order to stabilize top block 30 to outer coating 50.

Channels 80 and 82 are for injecting cement into the bottom of support post 20 to help connect it to a molten metal pump base in a manner known in the art. Any suitable molten metal pump base could be utilized.

Figure 2:
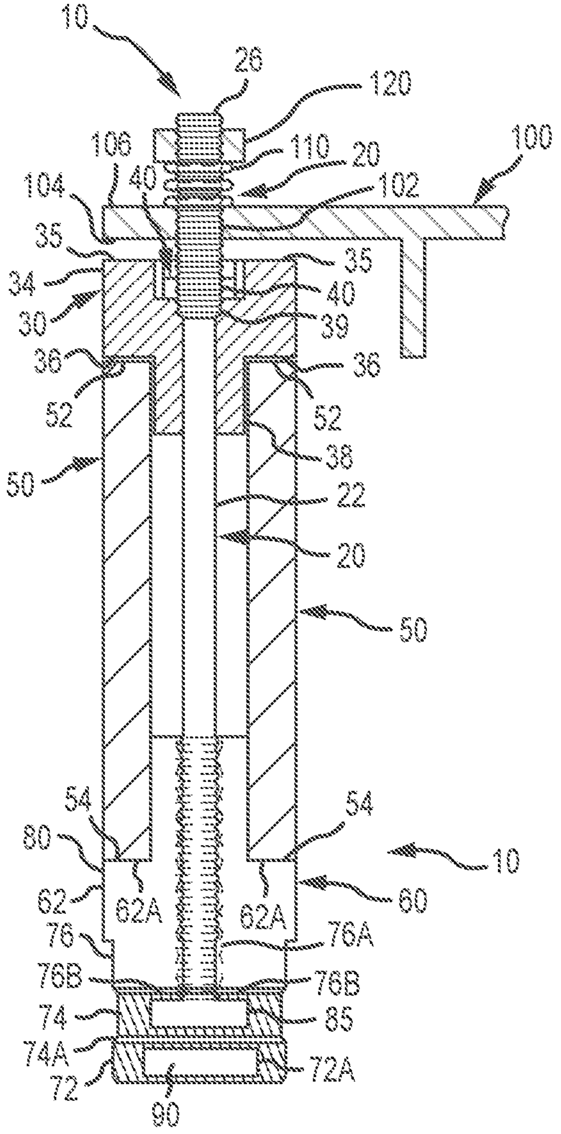
FIG. 2 is a side, partial cross-sectional view of the support post of FIG. 1 being mounted to a pump superstructure.
Figure 2B:
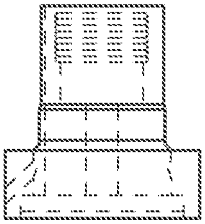
FIG. 2B is an optional bottom portion of the support post of FIGS. 1 and 2.
Figure 2E:
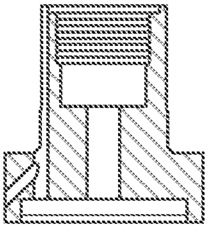
FIG. 2E is a cross-sectional view taken along lines E-E of FIG. 2C.
Figure 2C:
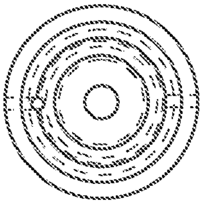
FIG. 2C is a top view of the bottom portion of the support post of FIG. 2B.
Figure 2D:
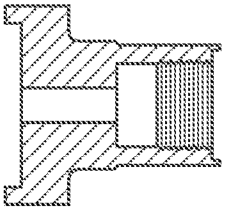
FIG. 2D is a cross-sectional view taken along lines D-D of FIG. 2C.

FIG. 2 shows the support post 10 of FIG. 1 being connected to a superstructure 100 of a molten metal pump, wherein the superstructure 100 supports the pump motor. The superstructure 100 is preferably a steel plate or platform, and is known in the art. Here, it has an opening 102 formed therethrough, a bottom surface 104, and a top surface 106. To add additional tension to outer core 50, a compression spring 110 and nut 120 are positioned on tension rod 20 above surface 106. Nut 120 is then tightened, which ultimately tightens surface 35 of top block 30 against bottom surface 104. Spring 110 need not be used but it or a similar flexible structure is preferred. Bottom (or second) support block 60 has an lower portion 62, a top surface that abuts bottom 70, a passage 64, and a sleeve extending above surface 62A and that is positioned inside of outer coating 50. Passage 64 is configured so tension rod 20 can pass therethrough. Upper portion 62 is beneath and outside of outer core 50, and surface 54 of outer core 50 rests against surface 62A of bottom block 62. Surface 62A applies axial tension to outer core 50 when surface 62A is pressed against it when the tension rod 20 is tightened to apply compressive force.

Outer core 50 could instead be comprised of graphite and/or blocks 30 and 60 could be comprised of ceramic. Further, any of sections 72, 74, 76 could be comprised of graphite or ceramic.

Figure 3:
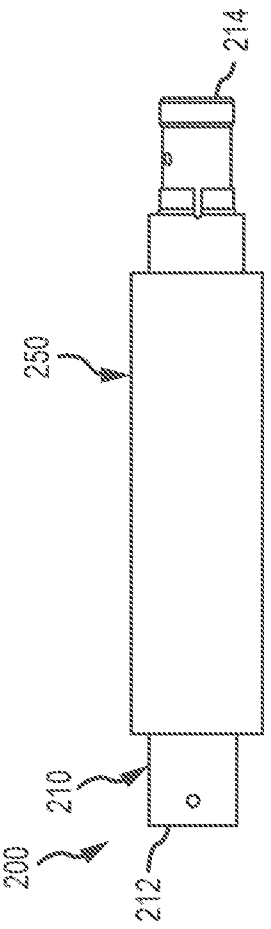
FIG. 3 is a side view of an alternate support post according to this disclosure.
Figure 4:
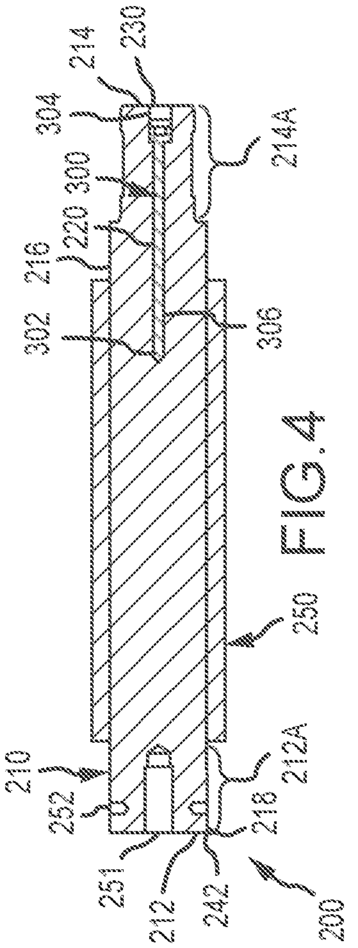
FIG. 4 is a side, cross-sectional view of the support post of FIG. 3.
Figure 5:
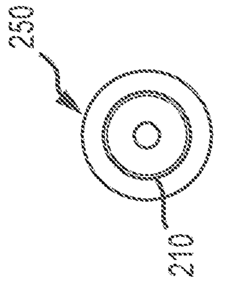
FIG. 5 is a top view of the support post of FIG. 3.
Figure 6:
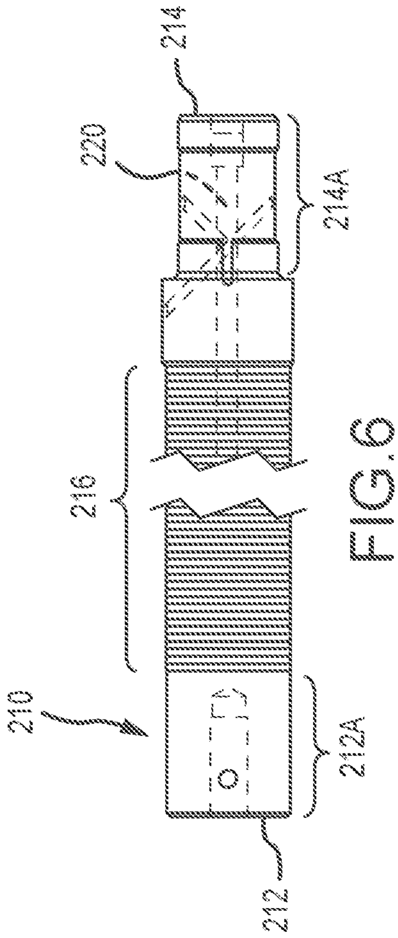
FIG. 6 is a partial, side view of the support post of FIG. 3 without the outer casing.
Figure 7:
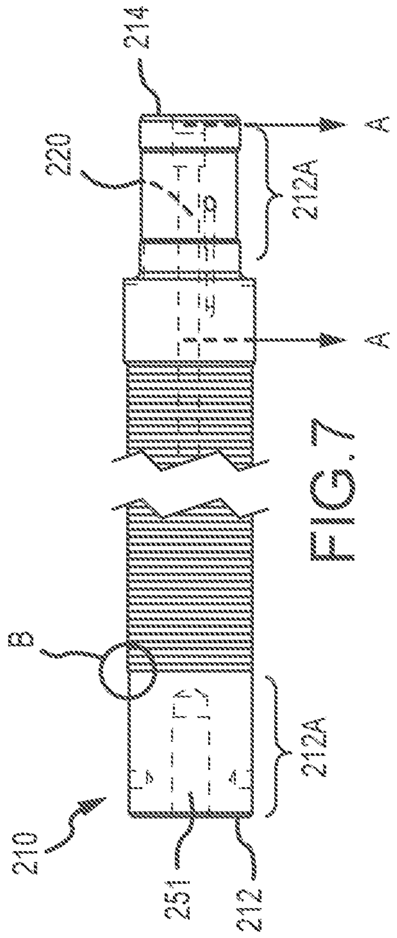
FIG. 7 is a partial, side view of the support post of FIG. 3 without the outer casing.
Figure 8:
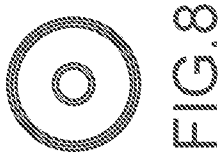
FIG. 8 is a top view of the support post of FIG. 6.
Figure 9:
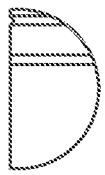
FIG. 9 is a close up view of detail B of FIG. 7.
Figure 10:
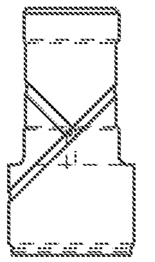
FIG. 10 is a side view taken along lines A-A of FIG. 7.
Figure 11A:
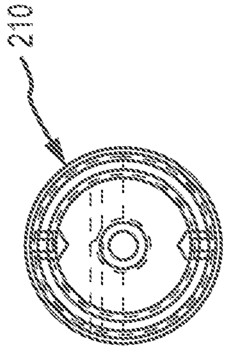
FIG. 11A is an end view of the support post of FIG. 11.
Figure 11:
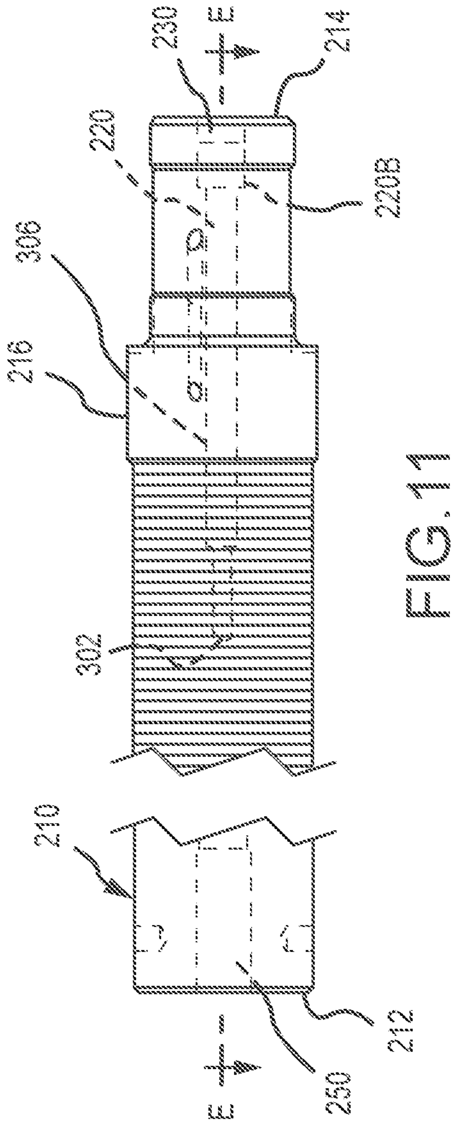
FIG. 11 is a bottom view of the support post of FIGS. 6 and 7.

FIGS. 3-5 show an alternate support post 200 with graphite core 210 and an outer ceramic (preferably silicon carbide) core 250. Alternatively, core 210 could be comprised of ceramic and/or outer core 250 could be comprised of graphite. A reinforcement member 300 is positioned in graphite core 210. In this embodiment outer core 250 is optional. Further, there may be more than one reinforcement member at either one end, or both ends of core 210. Or core 210 could have a single reinforcement member at each end or that extends therethrough or substantially therethrough.

As shown, the reinforcement member 300 is positioned in a manner, and is comprised of a material, such that it helps prevent the core 210 from breaking. Reinforcement member 300 is preferably comprised of steel, has a length of about 10% to 35%, or 15%-25% of the length of core 210, or a length of about 8" to 12", 10" to 16", or 12" to 16", and the cylindrical with a diameter about 1/10", 1/8", 1/6", 1/4" or 1/2", or about 10%-30% the diameter of portion 214 of core 210.

Core 210 has a top end 212, a bottom end 214, a top section 212A, a bottom section 214A, and a central portion 216. A bore 220 is formed in core 210 and extends from end 214, preferably through bottom section 214A and partially into section 216. As shown, bore 220 is formed in the center of core 210, although it could be off center.

Figure 12:
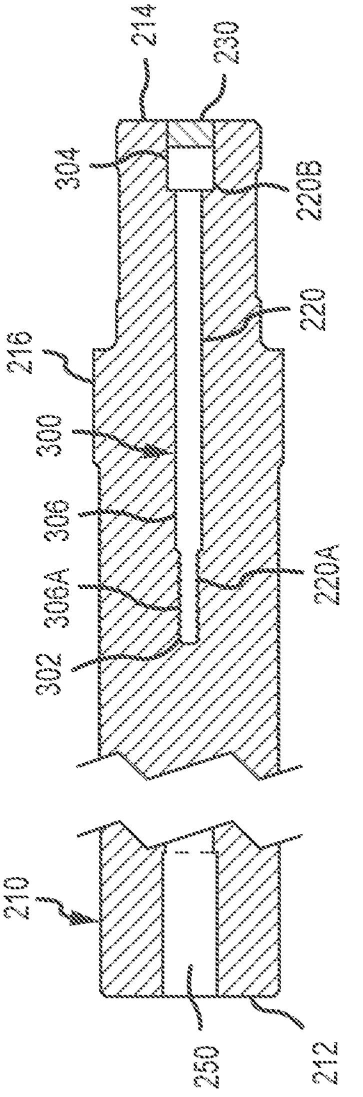
FIG. 12 is a cross-sectional side view of the support post of FIG. 11 taken along lines E-E.
Figure 13:
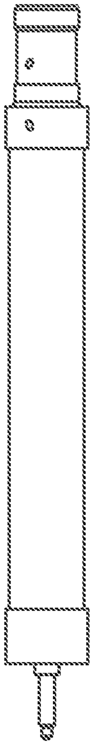
FIG. 13 is a side view of an alternate support post according to this disclosure.
Figure 14:
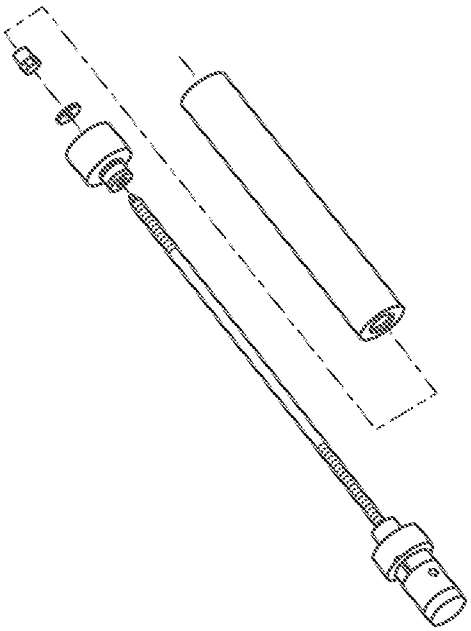
FIG. 14 is an exploded view of the support post of FIG. 13.
Figure 15:
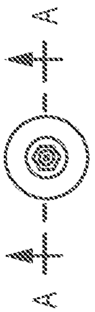
FIG. 15 is a top view of the support post of FIG. 13.
Figure 16:
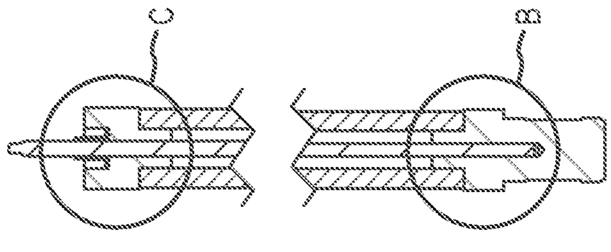
FIG. 16 is a cross-sectional, partial side view of the support post of FIG. 15 taken along lines A-A.
Figure 18:
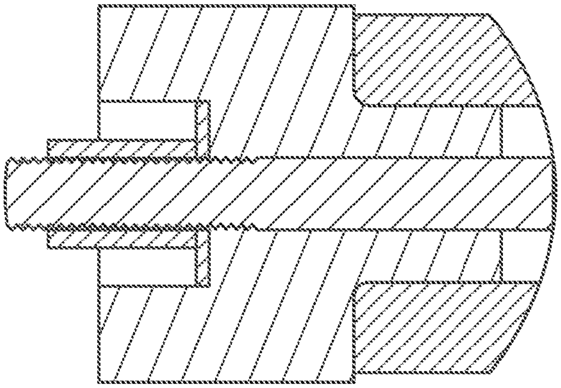
FIG. 18 is a close-up view of detail C shown in FIG. 16.
Figure 17:
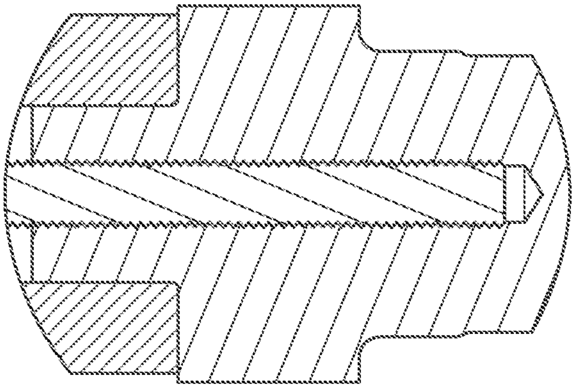
FIG. 17 is a close-up view of detail B shown in FIG. 16.
Figure 19:
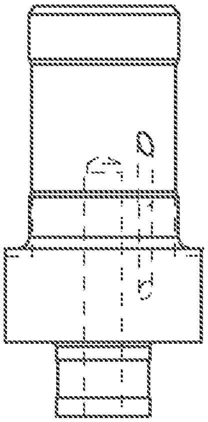
FIG. 19 is a side view of the base of the support post of FIGS. 3 and 6.
Figure 22:
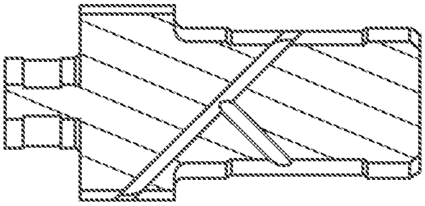
FIG. 22 is a cross-sectional side view taken along line E-E of FIG. 20.
Figure 20:
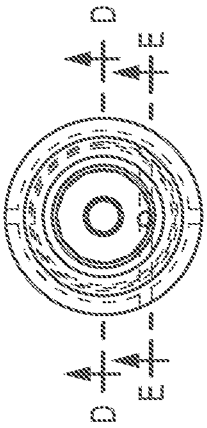
FIG. 20 is a top view of the base of FIG. 19.
Figure 21:
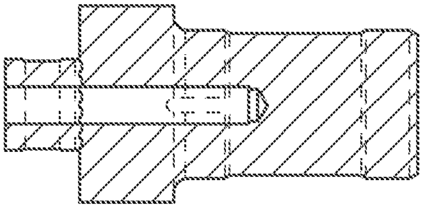
FIG. 21 is a cross-sectional side view taken along line D-D of FIG. 20.
Figure 25:
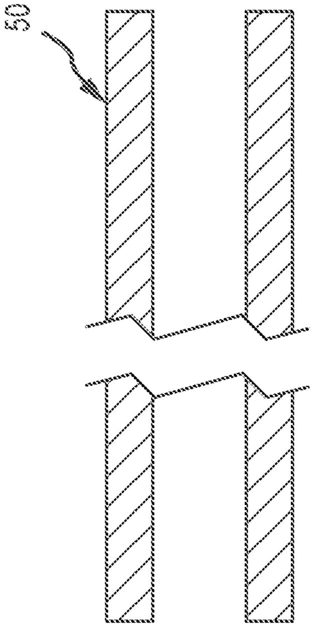
FIG. 25 is a side, cross-sectional view of the outer core taken along line F-F of FIG. 24.
Figure 24:
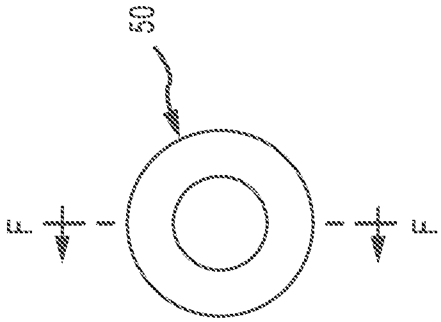
FIG. 24 is a top view of the outer core of FIG. 23.
Figure 23:
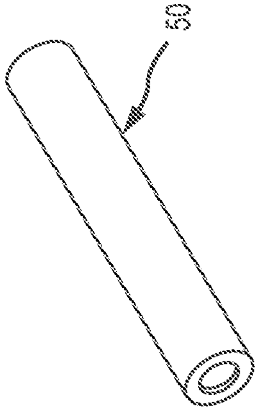
FIG. 23 is a perspective, side view of an outer core according to this disclosure.
Figure 27:
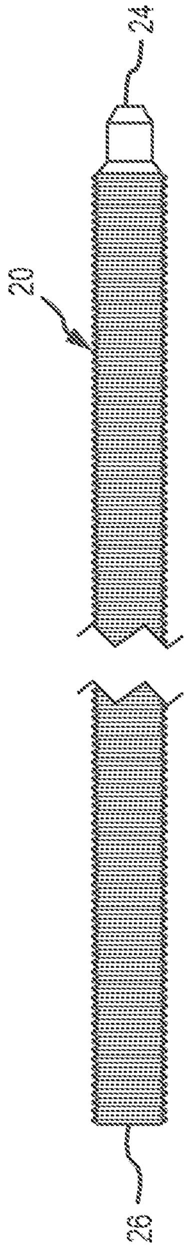
FIG. 27 is a partial, side view of the tension rod of FIG. 26.
Figure 26:
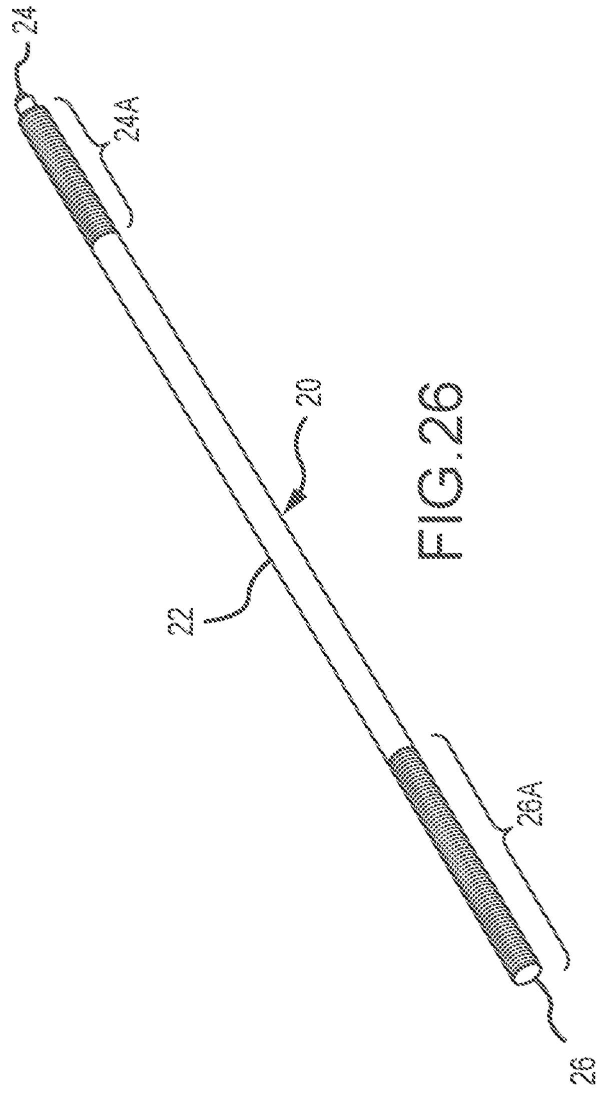
FIG. 26 is a perspective side view of a tension rod according to this disclosure.
Figure 28:
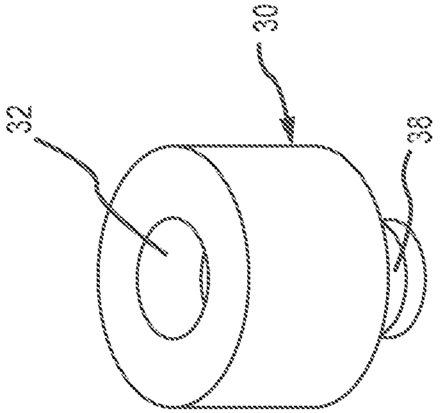
FIG. 28 is a perspective, top view of a support post top according to this disclosure.
Figure 29:
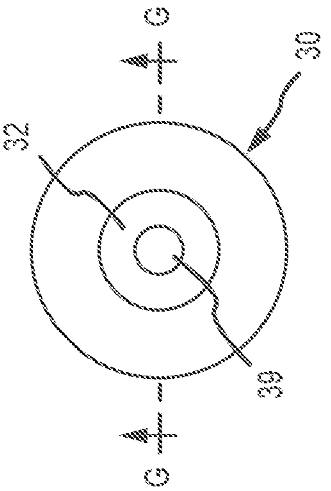
FIG. 29 is a top view of the support post top of FIG. 28.
Figure 30:
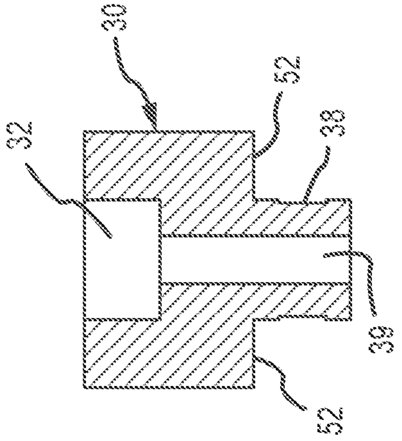
FIG. 30 is a side, cross-sectional view taken along line G-G of FIG. 29.

Reinforcement member 300 is positioned in bore 220 and may be secured by cement. Member 300 has a first end 302 that is preferably tapered and a second end 304. As shown, second end 304 is wider than the body portion 306. A cap 230 is positioned over second end 304 and preferably cemented in place to prevent molten metal from contacting reinforcement member 300. All or part of body portion 306 may be threaded so that member 300 is threaded into bore 220. As shown in FIG. 12, reinforcement member has a smaller-diameter portion 306A that is threaded. Portion 306A is threaded into smaller diameter portion 220A of bore 220. Larger diameter bore portion 220B receives second end 204.

Bores 250 and 252 are for connecting first end 212 of support post 200 to a support post clamp preferably positioned above the superstructure of a molten metal pump.

Some non-limiting examples of the disclosure are as follows:

Example 1

A component for use in a molten metal pump, the component comprising:

an outer core constructed of graphite or ceramic;

a tension rod positioned partially inside the outer core, wherein the tension rod has a first end and a second end, and is configured to apply an axial compressive force to the outer core in order to make the outer core less susceptible to breakage;

wherein the first end of the tension rod extends beyond the outer core and has an axially-compressive component positioned thereon, the axially-compressive component positioned against the outer core to place an axial-compressive force on the outer core.

Example 2

The component of example 1, wherein the tension rod has a first end and a second end, the outer core has a first end and a second end, and at least one of the first end or second end of the tension rod extends beyond either the first end or second end of the outer core.

Example 3

The component of example 2, wherein either the first end or the second end of the outer core has a cap, and the end of the tension rod that extends beyond the end of the outer core is tightened against the cap.

Example 4

The component of example 1, wherein the tension rod comprises at least one elongate, metal rod.

Example 5

The component of example 4, wherein the tension rod is comprised of steel.

Example 6

The component of example 1 that is a molten metal pump support post.

Example 7

The component of example 1, wherein the tension rod is secured in the outer core by cement.

Example 8

The component of example 7, wherein the tension rod is bonded to the outer core by the cement.

Example 9

The component of example 1, wherein the outer core comprises graphite.

Example 10

The component of example 1, wherein the outer core comprises silicon carbide.

Example 11

The component of example 1, wherein the outer core comprises material harder than graphite.

Example 12

The component of example 1, wherein the second end of the tension rod is inside of the outer core.

Example 13

The component of example 1, wherein the first end of the tension rod is threaded and the first axially-compressive component is a nut threaded onto the tension rod and tightened against the outer core.

Example 14

The component of example 1 that further includes a second axially-compressive component on the second end of the tension rod.

Example 15

The component of example 1, wherein the second end of the tension rod is threaded and that further comprises a second axially-compressive component at the second end of the tension rod.

Example 16

The component of example 15, wherein the second end of the tension rod is threaded and the second axially-compressive component is a nut threaded into the second end.

Example 17

The component of example 13, wherein the nut is hexagonal.

Example 18

The component of example 16, wherein the nut is hexagonal.

Example 19

The component of example 1 that further comprises a first support block at the first end of the outer core.

Example 20

The component of example 19, wherein the second axially-compressive component is positioned inside of the second support block.

Example 21

The component of example 19, wherein the first support block has a narrow portion positioned inside of the outer core and an enlarged portion that presses against at least part of the wall of the outer core.

Example 22

The component of example 20, wherein the second support block has an extension positioned inside of the outer core and an enlarged portion that presses against at least part of the wall of the outer core to provide axially-compressive force to the outer core.

Example 23

The component of example 1, wherein the second end of the extension rod extends beyond a stationary plate and a third axially-compressive component is positioned on the second end of the extension rod on a side of the stationary plate opposite the outer core, and the third axially-compressive component is compressed to the stationary plate.

Example 24

The component of example 23, wherein the stationary plate is a molten metal pump superstructure.

Example 25

The component of example 23 that includes a compression device between the third axially-compressive component and the stationary plate.

Example 26

The component of example 25, wherein the compression device is a spring.

Example 27

The component of example 19, wherein the first support block is comprised of graphite.

Example 28

The component of example 22, wherein the second support block is comprised of graphite.

Example 29

The component of example 20 that further includes a cap at the second end distal to the second axially-compressive component.

Some other non-limiting examples of the disclosure follow:

Example 1

A support post comprising an elongated body having a longitudinal axis and a height, a first end configured to connect to a superstructure and a second end configured to connect to a pump base, wherein the second end comprises at least one reinforcement section configured to make the second end resistant to breakage.

Example 2

The support post of example 1, wherein the at least one reinforcement section is elongated and has a longitudinal axis.

Example 3

The support post of example 2, wherein the longitudinal axis of the at least one reinforcement section is aligned with the longitudinal axis of the support post.

Example 4

The support post of example 1, wherein the support post is comprised of graphite and the at least one reinforcement section is comprised of one or more of the group consisting of: silicon carbide and steel.

Example 5

The support post of example 1, wherein the at least one reinforcement section is completely surrounded by the material of the support post so the reinforcement section is configured not to contact molten metal.

Example 6

The support post of example 1, wherein the at least one reinforcement section is less than 50% of the height of the support post.

Example 7

The support post of example 1, wherein the at least one reinforcement section is between 15%-35% of the height of the support post.

Example 8

The support post of example 1, wherein the at least one reinforcement section is between 15%-25% of the height of the support post.

Example 9

The support post of example 1, wherein the at least one reinforcement section has a cross-sectional area that is between ¼ and 1⁄10 the cross-sectional area of the second end of the support post.

Example 10

The support post of example 1, wherein the at least one Reinforcement Section has a Cross-Sectional Area that is Between ⅕ and ⅛ the Cross-Sectional area of the second end of the support post.

Example 11

The support post of example 1, wherein the support post has a bore in its second end and the at least reinforcement section is positioned in the bore.

Example 12

The support post of example 11 that further includes cement in the bore to anchor the at least one reinforcement section.

Example 13

The support post of example 1 that further includes a ceramic outer cover.

Example 14

The support post of example 1 that is cylindrical.

Example 15

The support post of example 1, wherein the reinforcement section is cylindrical.

Example 16

The support post of example 1, wherein the second end includes a first portion having a first diameter, and a second portion having a second diameter, wherein the second diameter is less than the first diameter.

Example 17

The support post of example 1, wherein the second end includes a first portion having a first cross-sectional area, and a second portion having a second cross-sectional area is less than the first cross-sectional area.

Example 18

The support post of example 16, wherein the at least one reinforcement section is positioned partially in the first portion and partially in the second portion.

Example 19

The support post of example 17, wherein the reinforcement section is positioned partially in the first portion and partially in the second portion.

Example 20

The support post of example 1 that is cylindrical with a center and the reinforcement section is positioned in the center.

Example 21

The support post of example 1 that further includes one or more channels in the second end, wherein the channels are configured to receive cement.

Example 22

The support post of example 1, wherein the first end is configured to fit into a coupling.

Example 23

The support post of example 11 that further includes a plug at a second tip of the support post, wherein the plug is configured to cover the bore.

Example 24

The support post of example 1 that includes a single reinforcement section.

Example 25

The support post of example 1, wherein the at least one reinforcement section is concrete, positioned in a bore inside of the second end of the support post.

Example 26

The support post of example 1, wherein the at least one reinforcement section extends the length of the support post.

Example 27

The support post of example 1, wherein the at least one reinforcement section has an outer surface including threads, wherein the at least one reinforcement section is threadingly received in the support post.

Example 28

The support post of example 27, wherein the threads are received in the support post at its first diameter and first cross-sectional area.

Example 29

The support post of example 27, wherein the at least one reinforcement section has a length and the threads extend along the entire length.

Example 30

The support post of example 27, wherein the at least one reinforcement section has a length and the threads extend at least 50% of the length.

Example 31

The support post of example 27, wherein the at least one reinforcement section has a length and the threads extend at least 25% of the length.

Example 32

The support post of example 1 that has one or more air-relief grooves.

Example 33

The support post of example 32 that has two air-relief grooves.

Example 34

The support post of example 16, wherein the second diameter is between 3.5" and 4.5".

Example 35

The support post of example 16, wherein the second portion has a height of between 6.0" and 7.0".

Example 36

The support post of example 1, wherein the reinforcement section has a diameter of between 0.75" and 1.25".

Having thus described different embodiments, other variations and embodiments that do not depart from the spirit of this disclosure will become apparent to those skilled in the art. The scope of the claims is thus not limited to any particular embodiment, but is instead set forth in the claims and the legal equivalents thereof. Unless expressly stated in the written description or claims, the steps of any method recited in the claims may be performed in any order capable of yielding the desired product. No language in the specification should be construed as indicating that any non-claimed limitation is included in a claim. The terms "a" and "an" in the context of the following claims are to be construed to cover both the singular and the plural, unless otherwise indicated herein.

What is claimed is:

1. A component for use in a molten metal pump, the component comprising:
- an outer core constructed of graphite or ceramic;
- a first axially-compressive component;
- a tension rod positioned partially inside the outer core, wherein the tension rod has a tension rod first end and a tension rod second end, and is configured to apply an axial compressive force to the outer core in order to make the outer core less susceptible to breakage when the first axially-compressive component is tightened on the tension rod second end; and
- a first support block at the outer core first end, wherein the first support block has (a) a passage in which a portion of the tension rod is positioned, (b) a narrow portion positioned inside of the outer core, and (c) an enlarged portion that presses against a top end of the wall of the outer core to provide axially-compressive force to the outer core when compressive force is applied to the first support block by the tension rod.

2. The component of claim 1, wherein the outer core has an outer core first end and an outer core second end, and at least one of the tension rod first end and tension rod second end extends beyond the outer core.

3. The component of claim 2, wherein either the outer core first end or the outer core second end has a cap tightened to an end of the tension rod that extends beyond the outer core.

4. The component of claim 1, wherein the tension rod comprises at least one elongate, metal rod.

5. The component of claim 4, wherein the elongate, metal rod is comprised of steel.

6. The component of claim 1 that is a support post for use in a molten metal pump.

7. The component of claim 1, wherein the tension rod is secured in the outer core by cement.

8. The component of claim 7, wherein the tension rod is bonded to the outer core by the cement.

9. The component of claim 1, wherein the outer core comprises graphite.

10. The component of claim 1, wherein the outer core comprises silicon carbide.

11. The component of claim 1, wherein the tension rod second end is inside of the outer core.

12. The component of claim 1, wherein the tension rod first end is threaded and the first axially-compressive component is a nut threaded onto the tension rod first end.

13. The component of claim 1 that further includes a second axially-compressive component on the tension rod first end.

14. The component of claim 1, wherein the tension rod first end is threaded and that further comprises a second axially-compressive component at the tension rod first end.

15. The component of claim 14, wherein the second axially-compressive component is a nut threaded onto the first end.

16. The component of claim 14, wherein the second axially-compressive component is positioned inside of a second support block.

17. The component of claim 1 that further includes a second support block having (a) a passage in which a portion of the tension rod is positioned, (b) a narrow portion positioned inside of the outer core, and (c) an enlarged portion that presses against a bottom end of the wall of the outer core to provide axially-compressive force to the outer core when compressive force is applied to the second support block by the tension rod.

18. The component of claim 17, wherein the second support block is comprised of graphite.

19. The component of claim 1, wherein the first support block is comprised of graphite.

20. The component of claim 1, wherein the tension rod second end extends beyond the outer core and beyond a stationary plate and a third axially-compressive component is positioned on the tension rod second end on a side of the stationary plate opposite the outer core and between the first axially-compressive component and the stationary plate, and the third axially-compressive component is compressed against the stationary plate.

21. The component of claim 20, wherein the third axially-compressive component is a spring.

22. The component of claim 20, wherein the stationary plate is a molten metal pump superstructure.

* * * * *